United States Patent
Watanabe et al.

(10) Patent No.: US 6,447,913 B1
(45) Date of Patent: Sep. 10, 2002

(54) THERMOPLASTIC POLYESTER RESIN COMPOSITION

(75) Inventors: Kazufumi Watanabe, Fuji (JP); Takayuki Ishikawa, Fuji (JP); Toru Katsumata, Fuji (JP); Tetsuya Hirose, Kariya (JP); Hiroyuki Wakabayashi, Kariya (JP)

(73) Assignees: Polyplastics Co., LTD, Osaka (JP); Denso Corporation, Aichi (JP)

( * ) Notice: Subject to any disclaimer, the term of this patent is extended or adjusted under 35 U.S.C. 154(b) by 0 days.

(21) Appl. No.: 09/744,470

(22) PCT Filed: Jun. 23, 2000

(86) PCT No.: PCT/JP00/04151
§ 371 (c)(1),
(2), (4) Date: Jan. 25, 2001

(87) PCT Pub. No.: WO00/78867
PCT Pub. Date: Dec. 28, 2000

(30) Foreign Application Priority Data

Jun. 23, 1999 (JP) .............................. 11-177267

(51) Int. Cl.[7] ......................... B32B 27/38; B32B 27/36; C08J 5/04; C08L 33/06

(52) U.S. Cl. ..................... 428/413; 524/267; 524/268; 524/306; 524/315; 524/462; 524/494; 524/504; 524/505; 524/506; 524/515; 524/520; 524/523; 524/533; 524/544; 524/545; 524/588; 524/556; 525/63; 525/64; 525/65; 525/101; 525/902; 525/69; 525/70; 525/71; 525/78; 525/165; 525/174; 525/885; 525/214; 525/215; 525/446; 264/331.21; 264/331.11; 264/331.18; 264/337; 428/447; 428/480

(58) Field of Search ................................. 524/267, 268, 524/306, 315, 462, 494, 504, 505, 506, 515, 520, 522, 523, 533, 544, 545, 556, 588; 264/331.11, 331.18, 331.21, 357; 525/63, 64, 65, 101, 902, 69, 70, 71, 78, 165, 174, 185, 214, 215, 446; 428/413, 447, 480

(56) References Cited

U.S. PATENT DOCUMENTS

| | | | | | |
|---|---|---|---|---|---|
| 5,068,283 | A | * | 11/1991 | Ohmae et al. | 525/64 |
| 5,412,028 | A | * | 5/1995 | Yeo et al. | 525/65 |
| 5,502,095 | A | * | 3/1996 | Ueshima et al. | 524/269 |
| 5,723,528 | A | * | 3/1998 | Mason | 524/492 |
| 6,180,251 | B1 | * | 1/2001 | Kanai et al. | 428/457 |
| 6,180,719 | B1 | * | 1/2001 | Miyata | 525/108 |
| 6,242,519 | B1 | * | 6/2001 | Cheret et al. | 524/396 |

FOREIGN PATENT DOCUMENTS

| | | |
|---|---|---|
| JP | 11-12454 | 1/1999 |
| JP | 11-92678 | 4/1999 |

\* cited by examiner

*Primary Examiner*—Robert Dawson
*Assistant Examiner*—Jeffrey B. Robertson
(74) *Attorney, Agent, or Firm*—Nixon & Vanderhye P.C.

(57) ABSTRACT

To provide a thermoplastic polyester resin composition which has a very good durability to alkaline solutions for a long period of time. That is, a thermoplastic polyester resin composition, wherein a thermoplastic polyester resin (A) is compounded with 1–25% by weight (in the total composition) of impact resistance rendering materials (B), 0.1–15% by weight (in the total composition) of a silicone compound and/or a fluorine compound (C), 1–50% by weight (in the total composition) of an inorganic filler (D), and 0.1–10% by weight of at least one polyfunctional compound (E) selected from the group consisting of an epoxy compound, an isocyanate compound and a carboxylic acid dianhydride. A molded article of the present invention has anti-stress properties even in a weld part thereof.

17 Claims, No Drawings

THERMOPLASTIC POLYESTER RESIN COMPOSITION

TECHNICAL FIELD OF THE INVENTION

The present invention relates to a thermoplastic polyester resin composition. More specifically, it relates to a thermoplastic polyester resin composition and a molded article thereof which have very excellent durability to alkaline solutions over a very long period of time. Furthermore, it relates to a thermoplastic polyester resin composition and a molded article thereof, which have excellent alkali resistance and excellent anti-stress qualities as well, and they are suitably used as materials or molded articles which need to keep good properties over a long period of time under sever environment.

PRIOR ART

Thermoplastic polyester resins, which are excellent in mechanical strength, electrical properties, and various other properties as crystalline thermoplastic resins, are used as engineering plastics for a variety of purposes including cars and electrical/electronic apparatuses. However, since the thermoplastic polyester resins cannot be said to secure durability to alkaline solutions over a long period of time, there has been a limit to the environment or purposes of use of the resins.

For example, some parts may be used in places frequently splashed with toilet detergents, bath detergents, bleachers, and snow-melting agents. These agents contain as components sodium hydroxide, sodium hypochlorite, sodium percarbonate, and calcium chloride and as a result, resin molded articles that may form the parts are exposed to an alkaline atmosphere.

When the resin molded articles are exposed to the alkaline atmosphere for a long period of time in the conditions where an excessive strain is imposed by screwing, press fit of metal, or caulking, the resin molded articles have encountered a problem of suffering both effects of the strain and alkali components that cause so-called environmental stress crack, thereby to develop cracks on the resin molded articles.

Polyester resins are general materials suitable for molding industrial parts. In many cases, an area fusion-bonded by jointing two or more interfaces of top of a flowing resin within a mold cavity on molding, or a weld area, is recognized in the molded articles formed of the resins. In general, the aforesaid environmental stress cracks are often produced in these weld areas of the molded articles, which has presented a problem.

Furthermore, an insert molding process of inserting the resin composition and a metal or an inorganic solid (hereinafter abbreviated as a "metal, etc.") is a molding process that is applied in a wide variety of fields at present because the process can provide the parts effectively exhibiting both properties of the resin composition and the metal, etc. However, there occurs distortion in the circumference of the metal, etc., because the resin and the metal, etc. are different in shrinkage and linear expansion coefficient. Therefore, when insert molded articles are allowed to stand for a long period of time under the circumstances where the articles are splashed with alkaline solutions, cracks are produced in the circumference of the metal, etc., which has presented a problem.

DISCLOSURE OF THE INVENTION

The present inventors have intensively studied in view of the aforesaid problems to search for a thermoplastic resin excellent in long-term durability to alkaline solutions. As a results, the inventors have found that a composition, mainly containing a thermoplastic polyester resin and blended with impact resistance rendering materials, a silicone compound and/or a fluorine compound, an inorganic filler and a polyfunctional compound, has very excellent resistance against alkaline solutions, thus accomplishing the invention.

That is, the present invention provides a thermoplastic polyester resin composition in which (A) a thermoplastic polyester resin is compounded with (B) 1 to 25% by weight (in the total composition) of impact resistance rendering materials, (C) 0.1 to 15% by weight (in the total composition) of a silicone compound and/or a fluorine compound, (D) 1 to 50% by weight (in the total composition) of an inorganic filler, and (E) 0.1 to 10% by weight (in the total composition) of at least one polyfunctional compound selected from the group consisting of epoxy compounds, isocyanate compounds and carboxylic dianhydrides. The thermoplastic polyester resin composition provided by the present invention comprises the aforesaid components (A), (B), (C), (D) and (E). The composition of the present invention has excellent resistance against alkaline solutions.

The present invention provides a molded article prepared by molding the aforesaid composition. The molded article can have a weld part in at least one portion, any one of a metal insert, a press-fitted member and a screwed part, or a press-fitted rigid member. The molded article includes insert molded articles prepared by insert molding of a metal or an inorganic solid.

DETAILED DESCRIPTION OF THE INVENTION

The invention is illustrated in detail below.

First, the thermoplastic polyester resin (A), that is the basic resin of the present invention, is polyesters prepared by polycondensation of dicarboxylic acid compounds and dihydroxy compounds, polycondensation of oxycarboxylic acid compounds, or polycondensation of the compounds consisting of these three components. It may be any of homopolyester and copolyester. Examples of the dicarboxylic acid compounds forming the thermoplastic polyester resin (A) used herein include known dicarboxylic acid compounds such as terephthalic acid, isophthalic acid, naphthalenedicarboxylic acid, diphenyldicarboxylic acid, diphenyl ether dicarboxylic acid, diphenylethanedicarboxylic acid, cyclohexanedicarboxylic acid, adipic acid and sebacic acid, and alkyl-, alkoxy- or halogen-substituted products thereof. These dicarboxylic acid compounds can be used in polymerization as ester-formable derivatives, for example, in the form of esters of lower alcohol such as dimethyl esters. Secondly, examples of the dihydroxy compounds forming the thermoplastic polyester resin (A) include dihydroxy compounds and polyoxyalkylene glycols such as ethylene glycol, propylene glycol, butanediol, neopentylglycol, hydroquinone, resorcin, dihydroxyphenyl, naphthalenediol, dihydroxyphenyl ether, cyclohexanediol, 2,2-bis(4-hydroxyphenyl)propane and diethoxybisphenol A, and alkyl-, alkoxy- or halogen-substituted products thereof. These compounds can be used singly or in admixture with two or more thereof. Examples of the oxycarboxylic acid compounds include oxycarboxylic acids such as oxybenzoic acid, oxynaphthoic acid and diphenyleneoxycarboxylic acid, and alkyl-, alkoxy- or halogen-substituted products thereof.

Ester-formable derivatives of these compounds also can be used herein. In the present invention, these compounds are used singly or in admixture with two or more thereof. Polyesters having a branched or crosslinked structure that is used with a small amount of a trifunctional monomer such as trimellitic acid, trimesic acid, pyromellitic acid, pentaerythritol and trimethylolpropane also can be cited in addition to these polyesters. In the present invention, any thermoplastic polyester prepared from the aforesaid compounds as monomer components through polycondensation can be used as the component (A) of the present invention. These polyesters are used singly or in admixture with two or more thereof. Among them, polyalkylene terephthalates are preferably used, and polybutylene terephthalates and copolymers principally containing them are more preferably used. In the present invention, the thermoplastic polyesters can be modified by the methods such as a known crosslinking or graft polymerization. of these thermoplastic polyesters, the polybutylene terephthalate resin has a particularly high resistance against alkaline solutions.

Furthermore, the polybutylene terephthalate used in the present invention shows satisfactory resistance against alkaline solutions particularly when the concentration of a carboxyl end group is preferably 50 meq/kg or less, and more preferably 35 meq/kg or less. In order to measure the concentration of a carboxyl end group, a finely divided sample of polybutylene terephthalate is heated in benzyl alcohol at 215° C. for 10 min to dissolve and the resulting solution is titrated with a 0.01N aqueous sodium hydroxide.

Typical examples of the impact resistance rendering materials (B) used in the present invention include thermoplastic elastomers and core-shell polymers. The thermoplastic elastomer is a generic term for polymeric substances, which is a solid exhibiting rubber-like elasticity at ordinary temperature but fusible with thermoplastic resins because the viscosity is reduced with an aid of heat. Addition of the component (B) leads to decrease in the internal stress generated in the resin, which makes it possible to inhibit the development of cracks in alkaline solutions. Accordingly, the component (B) is essential to the present invention.

The kinds of the thermoplastic elastomers are not particularly limited and examples thereof include olefins, styrenes, polyesters, polyamides and urethanes.

Preferred olefin elastomers are copolymers containing ethylene and/or propylene as principal components. Examples thereof include ethylene/propylene copolymers, ethylene/butene copolymers, ethylene/octene copolymers, ethylene/propylene/butene copolymers, ethylene/propylene/diene copolymers, ethylene/ethyl acrylate copolymers, ethylene/vinyl acetate copolymers and ethylene/glycidyl methacrylate copolymers, but are not limited to these copolymers.

Of these olefin elastomers, graft copolymers can be suitably used wherein ethylene/alkyl unsaturated carboxylate copolymers (a-1) or olefinic copolymers prepared by α-olefins and glycidyl esters of α,β-unsaturated acids (a-2) are chemically bonded with one or two or more of polymers or copolymers mainly composed by repeating units represented by the following formula (1) (b) in the form of a branched or crosslinked structure:

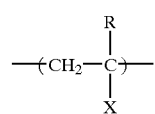

(I)

wherein R represents a hydrogen or a lower alkyl group; and X represents at least one group selected from —COOH, —COOCH$_3$, —COOC$_2$H$_5$, —COOC$_4$H$_9$, —COOCH$_2$CH(C$_2$H$_5$)C$_4$H$_9$,

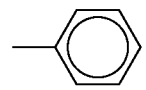

and —CN.

Such graft copolymers have a particular effect of improving the resistance against alkaline solutions and particularly suitably used as the impact resistance rendering materials of the present invention. Examples of the ethylene/alkyl unsaturated carboxylate copolymers (a-1) include random copolymers such as ethylene/acrylic acid copolymers, ethylene/methacrylic acid copolymers, ethylene/acrylic acid/ethyl acrylate copolymers, ethylene/ethyl acrylate copolymers, ethylene/vinyl acetate copolymers and ethylene/vinyl acetate/ethyl acrylate copolymers, and furthermore, mixtures of these copolymers can also be used.

α-Olefins, that are one side of monomers forming the olefin copolymers (a-2), include ethylene, propylene and butene-1, and ethylene is preferably used. The glycidyl esters of α, β-unsaturated acids that are the other side of the monomers forming the component (a-2) are compounds represented by the following formula (2). Examples thereof include glycidyl acrylate, glycidyl methacrylate and glycidyl ethacrylate, and in particular glycidyl methacrylate is preferably used.

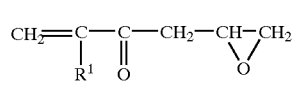

(2)

wherein R$^1$ represents hydrogen or a lower alkyl group.

α-Olefins (e.g., ethylene) and the glycidyl esters of α,β-unsaturated acids are generally copolymerized through a well-known radical polymerization to prepare the copolymers (a-2).

The suitable composition of the segment (a-2) consists of 70 to 99% by weight of α-olefins and 30 to 1% by weight of the glycidyl esters of α,β-unsaturated acids.

Polymers or copolymers (b) that are subjected to graft polymerization with the olefin copolymers (a-1) or (a-2) are homopolymers composed of one kind of the repeating units represented by the aforesaid general formula (1) or copolymers composed of two or more kinds of the repeating units. Examples thereof include poly(methyl methacrylate), poly(ethyl acrylate), poly(butyl acrylate), poly(2-ethylhexyl acrylate), polystyrene, polyacrylonitrile, acrylonitrile/styrene copolymers, butyl acrylate/methyl methacrylate copolymers and butyl acrylate/styrene copolymers. The butyl acrylate/methyl methacylate copolymers are particularly preferred. These polymers or copolymers (b) are also prepared through radical polymerization of the corresponding vinyl monomers.

In the graft copolymers for use in the present invention, the olefin copolymers of the aforesaid (a-1) or (a-2) or the polymers or copolymers of (b) are not to be separately used. The feature of the graft copolymers is to have a branched or crosslinked structure where the copolymers (a-1) or (a-2) and the polymers or copolymers (b) are chemically bonded together at least at one point. As described later, such graft structure exerts a remarkable effect that cannot be attained by singly blending (a-1), (a-2) or (b).

Herein, the ratio of (a-1) or (a-2) to (b) to compose the graft copolymers is suitably from 95:5 to 5:95 and more suitably from 80:20 to 20:80 in weight.

The preparation of the graft copolymers used in the present invention can be carried out according to any well-known process including chain transfer and irradiation with ionizing radiation. The most preferred one is the method where a graft copolymer precursor prepared by copolymerizing a monomer of the component (b) with a radical (co)polymerizable organic peroxide is melted and kneaded in the particles of a main chain component to carry out the graft reaction between the polymers. The reason for this is that the performance of the graft copolymers is more effectively exhibited because the resulting method presents a high degree of grafting and prevents secondary aggregation depending upon heat.

The styrene elastomers include block copolymers consisting of a polymer block principally containing a vinyl aromatic compound such as styrene and a polymer block principally containing a non-hydrogenated and/or hydrogenated conjugated diene compound.

As the vinyl aromatic compounds composing such block copolymers, one or two or more can be selected from styrene, α-methylstyrene, vinyltoluene, p-tert-butylstyrene, divinylbenzene, p-methylstyrene, 1,1-diphenylstyrene, etc. of these, styrene is preferred. As the conjugated diene compounds, one or two or more can be selected from butadiene, isoprene, 1,3-pentadiene, 2,3-dimethyl-1,3-butadiene, pirerylene, 3-butyl-1,3-octadiene, phenyl-1,3-butadiene, etc. Of these, butadiene, isoprene and a combination thereof are preferred.

The block copolymers herein meant are those consisting of polymer block A principally containing the vinyl aromatic compounds and polymer block B principally containing the conjugated diene compounds. The ratio of the vinyl aromatic compounds and the conjugated diene compounds in copolymerization is from 5/95 to 70/30, and particularly preferably from 10/90 to 60/40.

The number average molecular weight of the block copolymers of the present invention ranges from 5,000 to 600,000 and preferably from 10,000 to 500,000 and the distribution of molecular weights [ratio of the weight average molecular weight (Mw) to the number average molecular weight (Mn) (Mw/Mn)] is 10 or less. The molecular structures of the block copolymers can be straight chain, branched chain or radial structures, or include all arbitrary combinations of these structures.

For example, the block copolymers of the vinyl aromatic compounds and the conjugated diene compounds having the structures of A—B—A, B—A—B—A, (A—B—)$_4$Si, A—B—A—B—A, and the like. Furthermore, the unsaturated bonds of the conjugated diene compounds of the block copolymers can be partially hydrogenated.

The preparation of the block copolymers in the present invention can be carried out according to any process as long as the copolymers having the aforesaid structures can be obtained. For example, the block copolymers of the vinyl aromatic compounds and the conjugated diene compounds can be synthesized in the presence of a lithium catalyst, etc. in an inert solvent according to procedures as described in JP-B 40-23798, JP-B 43-17979, and JP-B 56-28925. In addition, the block copolymers partially hydrogenated can be synthesized by hydrogenation in an inert solvent in the presence of a hydrogenating catalyst according to the procedures as described in JP-B 42-8704, JP-B 43-6636 or JP-B 59-133203.

Epoxy-modified block copolymers obtained by epoxidation of the aforesaid block copolymers can be usable in the present invention.

The epoxy-modified block copolymers of the present invention can be prepared by a reaction of the aforesaid block copolymers with an epoxidizing agent such as hydroperoxides or peracids in an inert solvent.

The hydroperoxides include hydrogen peroxide, tert-butylhydroperoxide and cumene peroxide.

The peracids include performic acid, peracetic acid, perbenzoic acid and trifluoroperacetic acid. Of these, peracetic acid is a preferred epoxidizing agent because it is commercially produced in large quantities, available inexpensively and also excellent in stability.

In the epoxidation, a catalyst can be used as needed. For example, for peracids, an alkali such as sodium carbonate or an acid such as sulfuric acid is used as the catalyst. For hydroperoxides, use of a mixture of tungstic acid and sodium hydroxide together with hydrogen peroxide or joint use of molybdenum hexacarbonyl together with tert-butylhydroperoxide can exert a catalytic effect.

The amount of the epoxidizing agents is not strictly regulated. In each case, the most suitable amount is determined depending upon variable factors such as individual epoxidizing agents used, a desired degree of epoxidation, and individual block copolymers used.

The inert solvents are used for the purpose of lowering the viscosity of raw materials and stabilizing the epoxidizing agents by dilution. For peracetic acid, ethers or esters can be used when these are aromatic compounds. Particularly preferred solvents are hexane, cyclohexane, toluene, benzene, ethyl acetate, carbon tetrachloride and chloroform. Reaction conditions of the epoxidation are not strictly regulated. The reactivity of an epoxidizing agent used determines the range of a reaction temperature. For example, for peracetic acid, the preferred range of the reaction temperature is from 0 to 70° C. The temperature lower than 0° C. retards the reaction whereas exceeding 70° C. causes the decomposition of the peracetic acid. For a tert-butylhydroperoxide/molybdenum dioxide diacetyl acetonate system that is an example of the hydroperoxides, the preferred range of the reaction temperature is from 20 to 150° C. for the same reason. Special operations of the reaction mixture are not necessary, and for example, the mixture is just stirred for 2 to 10 hours. Separation of the resulting epoxy-modified copolymers can be carried out according to an appropriate procedure such as precipitation with a poor solvent, distilling away of solvent after pouring the polymers into hot water with stirring and direct desolvation.

The epoxy equivalent of the aforesaid epoxy-modified block copolymers is preferably from 140 to 2700 g/mol and more preferably from 200 to 2000 g/mol. The epoxy equivalent exceeding 2700 g/mol results in insufficient compatibility and has a tendency to cause phase separation. On the other hand, the epoxy equivalent less than 140 g/mol is unpreferred because a side reaction such as formation of a gel tends to occur in the course of separation of the polymers.

Examples of the polyester elastomers include block copolymers where aromatic polyesters such as polyethylene terephthalate and polybutylene terephthalate are a hard segment and polyethers such as polyethylene glycol and polytetramethylene glycol or aliphatic polyesters such as polyethylene adipate, polybutylene adipate and polycaprolactone are a soft segment, but are not limited to these block copolymers.

Examples of the polyamide elastomers include block copolymers where nylon 6, nylon 66, nylon 11 or nylon 12 is a hard segment and polyethers or aliphatic polyesters are a soft segment, but are not limited to these block copolymers.

Examples of the urethane elastomers include block copolymers where polyurethanes prepared by reaction of a diisocyanate such as 4,4'-diphenylmethane diisocyanate, 4,4'-dicyclohexylmethane diisocyanate, tolylenediisocyanate and hexamethylenediisocyanate with a glycol such as ethylene glycol and tetramethylene glycol are a hard segment and polyethers such as polyethylene glycol, polypropylene glycol and polytetramethylene glycol or aliphatic polyesters such as polyethylene adipate, polybutylene adipate and polycaprolactone are a soft segment, but are not limited to these block copolymers.

On the other hand, the core-shell polymer has a multilayer structure and is preferably a core-shell type graft copolymer where a rubber layer having an average particle diameter of 1.0 $\mu$m or less is covered with a glassy resin. The rubber layer used for the core-shell copolymer has an average particle diameter of 1.0 $\mu$m or less and the preferred range therefor is from 0.2 to 0.6 $\mu$m. When the average particle diameter of the rubber layer exceeds 1.0 $\mu$m, the effect of improving the resistance against alkaline solutions may become insufficient in some cases. As the rubber layers of the core-shell copolymers, those prepared by copolymerizing/graft copolymerizing silicone-, diene- or acrylic-based elastomers singly, or two or more elastomer components selected from these can be used.

The silicone elastomers are prepared by the polymerization of organosiloxane monomers. Examples of the organosiloxanes include hexamethyltricyclosiloxane, octamethylcyclosiloxane, decamethylpentacyclosiloxane, dodecamethylhexacyclosiloxane, trimethyltriphenylsiloxane, tetramethylphenylcyclotetrasiloxane and octaphenyl-cyclotetrasiloxane. The acrylic rubbers are prepared by the polymerization of an acrylic ester such as butyl acrylate with a small amount of a crosslinking monomer such as butylene diacrylate.

The aforesaid acrylic esters include methyl acrylate, ethyl acrylate, propyl acrylate, hexyl acrylate and 2-ethylhexyl acrylate as well as butyl acrylate. The crosslinking monomors include acrylic esters of polyols such as butylene dimethacrylate and trimethylolpropane as well as butylene diacrylate; vinyl compounds such as divinylbenzene, vinyl acrylate and vinyl methacrylate; and allyl compounds such as allyl acrylate, allyl methacrylate, diallyl maleate, diallyl fumarate, diallyl itaconate, monoallyl maleate, monoallyl fumarate and triallyl cyanurate. Examples of the diene rubbers include polybutadiene prepared by the polymerization of a butadiene monomer.

In the core-shell copolymers, vinyl polymers are used for the shell layer formed of the glassy resin. The vinyl polymers are obtained by the polymerization or copolymerization of at least one monomer selected from aromatic vinyl monomers, cyanided vinyl monomers, methacrylic ester monomers and acrylate ester monomers. In general, these rubber and shell layers of the core-shell copolymers are bonded through graft copolymerization. This graft copolymerization is carried out, if necessary, by adding a graft crosslinking agent reacting with the shell layer in the polymerization of the rubber layer, providing reactive groups to the rubber layer, and allowing the shell layer to form. The graft crosslinking agents are silicone rubber such as organosiloxanes containing vinyl bonds and organosiloxanes containing thiol groups. Acryloxysiloxane, methacryloxysiloxane and vinylsiloxane are preferably used.

Examples of the core-shell polymers as described above include KANEACE FM manufactured by Kaneka Corp., METABRENE W-300, W-530 and S-2001 manufactured by Mitsubishi Rayon Co., Ltd., ACRYLOID KM-323 and KM-330 manufactured by Rohm and Haas Co., PARALOID EXL-2311 and -3211 manufactured by Kureha Chemical Industry Co., Ltd., and STAFILOID P-3267 manufactured by Takeda Chemical Industries, Ltd. (The foregoing are trade names).

The content of the impact resistance rendering materials of the component (B) in the total compositions is from 1 to 25% by weight, preferably from 2 to 20% by weight, and more preferably from 3 to 15% by weight. A too small amount of the component (B) fails to have a high resistance against alkaline solutions that is the object of the invention. On the other hand, a too large amount thereof unpreferably results in deteriorating mechanical properties such as rigidity. The impact resistance rendering materials can be used singly or in admixture with two or more thereof.

The silicone compound and/or the fluorine compounds of component (C) used in the present invention are essential components for preventing the alkaline solutions from permeating into the resin.

Preferred silicone compounds include pure silicone resins, known as silicone oil in general, such as dimethylpolysiloxane, methylphenylpolysiloxane and diphenylpolysiloxane; and modified silicones prepared by the reaction of the pure silicone resins with resins for modification such as alkyd resins, polyester resins, acrylic resins and epoxy resins, but are not limited to these resins.

Above all, hardened silicone powder having silicone oil absorbed is suitably used as the component (C) of the present invention.

In order to produce the silicone oil-absorbing hardened silicone powder used herein, 0.5 to 80% by weight of silicone oil is blended with a finely divided hardened silicone to allow absorption and then powdered according to an arbitrary procedure.

Conventionally known silicone rubbers or silicone gels can be used as silicones to form the hardened silicone powder by the absorption of the silicone oil.

The silicone rubbers are organic peroxide-curing type silicone rubbers, addition reaction-curing type silicone rubbers and condensation reaction-curing type silicone rubbers. The addition reaction-curing type silicone rubbers or the condensation reaction-curing type silicone rubbers are preferred because of its easiness in production and handling.

The silicone gels are silicones which partly have a three-dimensional network by crosslinking organopolysiloxanes as a principal component and exhibit deformation and limited fluidity by addition of stress.

The hardened silicone powder of the present invention contains the following silicone oils and is preferably from 0.1 to 20,000 $\mu$m in particle diameter. The diameter less than 0.1 $\mu$m results in lowering the effect of improving physical properties of various materials whereas exceeding 20,000 $\mu$m makes it difficult to blend with various materials.

The silicone oils absorbed by the hardened silicone powder are liquid organopolysiloxanes having siloxane bonds as main chains, but the kinds thereof are not particularly limited.

For example, the silicone oils include those represented by the following formula (3):

$$R_3SiO[R_2SiO]_nSiR_3 \tag{3}$$

wherein R is a substituted or unsubstituted monovalent hydrocarbon group or hydroxyl group; and n is an integer. In the formula, R is a substituted or unsubstituted monovalent hydrocarbon group including alkyl groups such as methyl group, ethyl group and propyl group; alkenyl groups such as vinyl group and allyl group; aralkyl groups such as cycloalkyl group and β-phenylethyl group; 3,3,3-trifluoropropyl group, 3-mercaptopropyl group, 3-aminopropyle group and 3-glycidoxypropyl group.

The molecular weight of the silicone oils is not particularly limited, but the silicone oils are preferably liquid and particularly preferably have a dynamic viscosity of 100 to 200,000 cSt at 25° C. The dynamic viscosity more preferably ranges from 5000 to 150,000 cSt and particularly preferably from 10,000 to 100,000 cSt.

Preferred fluorine compounds include fluorine-containing oligomers, polytetrafluoroethylene, tetrafluoroethylene/perfluoroalkyl vinyl ether copolymers, tetrafluoroethylene/hexafluoropropylene copolymers, tetrafluoroethylene/ethylene copolymers, polychloro-trifluoroethylene, polyvinylidene fluoride, tetrafluoroethylene/hexafluoropropylene/perfluoroalkyl vinyl ether copolymers, chlorotrifluoroethylene/ethylene copolymers and polyvinyl fluoride, but are not limited to these fluorine compounds.

These compounds can be used singly or in admixture with one or two or more thereof.

The content of the component (C) in the total compositions is from 0.1 to 15% by weight and preferably from 0.5 to 5% by weight.

A too small amount of the component (C) fails to produce a desired effect of the resistance against alkaline solutions. On the other hand, a too large amount thereof unpreferably results in causing troubles such as generation of a gas on kneading and bite of screw on molding.

The inorganic filler of the component (D) used in the present invention is an essential component for improving the resistance against alkaline solutions because the fillers can lower the molding shrinkage of the molded articles, the coefficient of linear expansion and the generation of distortion. A variety of fillers in the form of fiber or non-fiber (particle, plate) are used as the inorganic fillers according to the purposes.

Of these fillers, examples of the fibrous fillers include glass fiber, odd-shaped glass, asbestos fiber, carbon fiber, silica fiber, silica/alumina fiber, zirconia fiber, boron nitride fiber, silica nitride fiber, boron fiber, potassium titanate fiber, and metallic fiber materials such as stainless, aluminum, titanium, copper and brass, but are not limited to these materials. Particularly, typical fibrous fillers are glass fiber and carbon fiber, and glass fiber is more preferably used.

Examples of the particulate fillers include silicates such as carbon black, silica, ground quartz, glass beads, glass powder, calcium silicate, kaolin, talc, clay, diatomaceous earth and wollastonite; metallic oxides such as iron oxide, titanium oxide, zinc oxide and alumina; metallic carbonates such as calcium carbonate and magnesium carbonate; metallic sulfate such as calcium sulfate and barium sulfate; silicon carbide, silicon nitride, boron nitride, and various metal powder, but are not limited to these materials.

The plate fillers include mica, glass flake and various metallic leaves, but are not limited to these materials.

These inorganic fillers are used singly or in admixture with one or two or more thereof. In the use of these inorganic fillers, coating agents or surface treatments are desirably used as needed. The content of the inorganic filler (D) in the total compositions is from 1 to 50% by weight, preferably from 10 to 45% by weight, and more preferably from 20 to 40% by weight. A too small amount of the fillers results in lowering the effect of improving the resistance against alkaline solutions whereas a too large amount thereof makes molding operations difficult.

In the invention, at least one polyfunctional compound selected from the group consisting of epoxy compounds, isocyanate compounds and carboxylic dianhydrides is further blended as the component (E).

The polyfunctional compound of the component (E) used in the invention includes epoxysilanes, bisphenol A type epoxy compounds, bisphenol F type epoxy compounds, resorcin type epoxy compounds, novolac type epoxy compounds, alicyclic compound type diepoxy compounds, glycidyl ethers, epoxidized polybutadienes, triglycidyl diisocyanate, diisocyanate compounds and carboxylic dianhydrides. More concretely, examples thereof include epoxysilanes such as α-glycidoxypropyltriethoxysilane, α-glycidoxypropylmethoxy-silane and β-(3,4-epoxycyclohexyl)-ethyltrimethoxysilane; alicyclic compound type epoxy compounds such as bisphenol A type epoxy compounds, bisphenol F type epoxy compounds, resorcin type epoxy compounds, novolac type epoxy compounds, vinylcyclohexene dioxide and dicyclopentadiene oxide; diisocyanate compounds such as 2,4-tolylenediisocyanate, 4,4'-diphenylmethanediisocyanate, tolidine diisocyanate, hexamethylenediisocyanate, m-xylenediisocyanate, 1,5-naphthalene diisocyanate and derivatives of the aforesaid isocyanates (polymeric urethane, oligomers higher than an urethidione dimer and cyanurate polymers); and carboxylic dianhydrides such as pyromellitic dianhydride, naphthalenetetracarboxylic dianhydride, and for example, bis(3,4-dicaroxyphenyl)alkane dianhydride represented by the following formula:

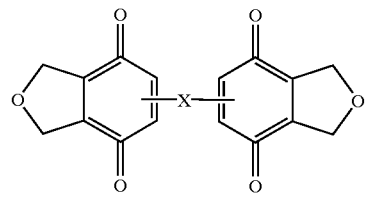

wherein X represents —O—, —SO$_2$—, —CO— or a divalent hydrocarbon. Of these polyfunctional compounds, preferred compounds are the bisphenol A type epoxy compounds represented by the following formula:

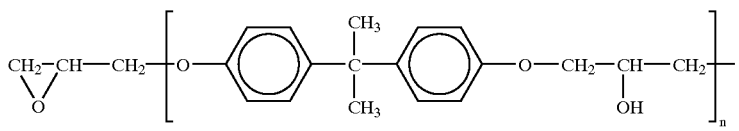

-continued

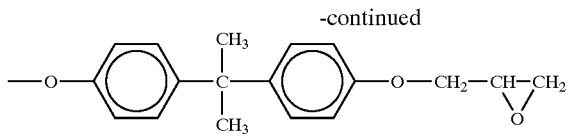

wherein, n represents an integer of 0 to 20. These polyfunctional compounds can be used singly or in admixture with two or more thereof.

The content of the component (E) in the total compositions is from 0.1 to 10% by weight and preferably from 0.5 to 5% by weight. A too small content thereof causes deterioration in the effect on the resistance against alkaline solutions that is the object of the present invention whereas a too large content thereof unpreferably results in suffering a problem of molding.

In the present invention, other thermoplastic resin components than the aforesaid components can be used in a small amount as an auxiliary according to purposes. Any resin stable at high temperatures can be used as the other thermoplastic resin components. Examples thereof include polyamides, polycarbonates, polyphenylene sulfides, polyphenylene oxides, polyacetals, acrylonitrile/styrene resins, acrylonitrile/butadiene/styrene resins, polysulfones, polyether sulfones, polyether imides, polyether ketones and fluororesins. These thermoplastic resins can be used in admixture with two or more thereof.

In order to impart desired properties to the resin compositions of the present invention according to purposes, known substances generally added to thermoplastic resins and thermosetting resins can be blended, including stabilizers such as antioxidants and ultraviolet absorbers, antistatic agents, colorants such as dyes and pigments, lubricants, release agents, crystallization promotors and nucleating agents.

The preparation of the compositions of the present invention is easily carried out by known equipment and methods that are in general used for the conventional preparation of resin compositions. Any of the following processes can be used; I) After each component is mixed, pellets are prepared through kneading extrusion by use of an extrusion machine and then subjected to molding; II) Pellets different in composition are once prepared, mixed in respectively specified amounts and subjected to molding, thereby to obtain a molded product having an aimed composition; and III) One or two or more of the components are directly supplied to a molding machine. A preferred method for uniformly blending these components is to pulverize a part of resin components and then mix with the other components.

The compositions of the present invention can be applied to various processes for molding and formed into various molded articles. That is, the compositions are suitably applied not only to injection molding (insert molding) but also to extrusion molding, blow molding (various hollow articles), vacuum forming and compression molding. They are in particular suitable for molded products having any one of a metal insert, a press-fit member and a screwed part, or a weld part, the molded article being used in places contacting with water, alkali, etc. under stress. That is, the compositions of the present invention are also suitable for the purposes of the caulking of the molded article and a metallic part and incorporating them by press fitting. Typical press-fitted rigid members are metals and thermosetting resins. In the insert molded articles of the present invention, metal is previously fitted in a mold and the aforesaid blended resin composition is filled in the outside of the metal to prepare a complex molded article. The molding method for filling the resins in a mold includes injection molding and extrusion compression molding, but the general one is injection molding. Materials to insert in the resins are used in order to utilize the properties efficiently and compensate drawbacks that the resins have. Therefore, the materials used are those which do not change in shape or do not melt when the materials contact with the resins. Mainly metals such as aluminum, magnesium, copper, iron, brass and the alloys of these, and inorganic solids such as glass and ceramics, which are formed beforehand into sticks, pins, screws, etc. are used as the materials inserted.

EFFECTS OF THE INVENTION

As described above, the compositions and molded articles of the present invention have very excellent long-term durability to alkaline solutions and can be suitably used in a wide variety of the fields such as electric, electronic, automobile and general merchandise fields.

EXAMPLES

Herein after, the invention is illustrated through examples in further detail, but these examples are not to be construed as limiting the invention. The resistance against alkaline solutions is evaluated as follows.

Evaluation (1)

Pellets of a resin composition are formed into molded specimens having a thickness of 1 mm and a side length of 80 mm at a cylinder temperature of 250° C., a mold temperature of 70° C., an injection time of 20 seconds, and a cooling time of 10 seconds. Subsequently, test specimens of an 80 mm side length and a 10 mm width are cut out in the fluid direction from the molded specimens. The resulting test specimens are deflected, fixed to jigs, and held in a condition where bending strain of two percent is applied to the test specimens all the time. Under these conditions, the test specimens are immersed together with the jigs in a 10% solution of sodium hydroxide and a time elapsing till a crack develops in the test specimens is measured at a peripheral temperature of 23° C.

Evaluation (2)

Pellets of a resin composition are subjected to insert injection molding at a cylinder temperature of 250° C., a mold temperature of 70° C., an injection time of 20 seconds, and a cooling time of 10 seconds in a mold for molding test specimens (the mold where an iron core of 18 mm in length×18 mm in width×30 mm in height is inserted into a square pillar of 22 mm in length×22 mm in width×51 mm in height) so as to be 1 mm in the least thickness of the resin portion to produce an insert molded article. The resulting insert molded article is immersed in a 10 percent solution of sodium hydroxide and a time elapsing till a crack develops in the insert molded product is measured at a peripheral temperature of 80° C.

Evaluation (3)

Pellets of a resin composition are formed into molded specimens of 1 mm in thickness 120 mm in side length at a cylinder temperature of 250° C., a mold temperature of 70° C. Subsequently, weld areas are made on the specimens and test specimens of 10 mm in width×100 mm in length are cut out. The resulting test specimens are deflected, fixed to jigs, and held in a condition where bending strain of 1% and 0.5% is applied to the weld area. Under these conditions the test specimens are immersed together with the jigs in a 10% solution of sodium hydroxide and a time elapsing till a crack develops in the test specimen is measured at a peripheral temperature of 23° C.

Examples 1 to 17

Components (A) to (E) of the compositions as shown in Table 1 were melted and kneaded with an extrusion machine to make pellets and the properties of resistance against alkaline solutions were evaluated as described above. Results of evaluation are also shown in Table 1.

The details of the respective components used are as follows.

Component (A)
- (A1) Polybutylene terephthalate (PBT) having 15 meq/kg of carboxyl end groups.
- (A2) PBT having 30 meq/kg of carboxyl end groups.
- (A3) PBT having 40 meq/kg of carboxyl end groups.
- (A4) PBT having 60 meq/kg of carboxyl end groups.

Component (B)
- (B1) A graft copolymer consisting of 70 parts by weight of an ethylene/ethyl acrylate copolymer and 30 parts by weight of a methyl methacrylate/butyl acrylate copolymer (EEA-g-BA/MMA; Manufactured by NOF Corporation; MODIPER A5300).
- (B2) An acrylic core-shell polymer (Manufactured by Kureha Chemical Industry Co., Ltd.; PARALOID EXL-2311).
- (B3) An epoxidized styrene/butadiene/styrene copolymer (ESBS, Manufactured by Daicel Chemical Industries, Ltd.; EPOFRIEND A1010).
- (B4) A graft copolymer consisting of 70 parts by weight of ethylene/glycidyl methacrylate copolymer and 30 parts by weight of methyl methacrylate copolymer (EGMA-g-MMA; Manufactured by NOF Corporation; MODIPER A4200)

Component (C)
- (C1) Silicone oil-containing hardened silicone powder (Manufactured by Dow Corning Toray Silicone Co., Ltd.; TOREFIL F202).
- (C2) A perfluoroalkyl group-containing oligomer (Manufactured by Dainippon Ink and Chemicals Inc.; MEGAFAX ESM-1)

Component (D)
- (D1) Glass fiber (10 $\mu$m in diameter)

Component (E)
- (E1) A bisphenol A type epoxy resin (Manufactured by Yuka-Shell Epoxy K. K.; EPICOAT 1004K)
- (E2) Isophorone diisocyanate (Manufactured by Daicel Huels Ltd.; VESTANATT1890)

Comparative Example 1 to 15

For comparison, compositions where any one or more were excluded from components (B) to (E) as shown in Table 2 were melted and kneaded with an extrusion machine to make pellets, and the resistance against alkaline solutions was evaluated. Results are also shown in Table 2.

Example 18 and Comparative Examples 16 and 17

Components (A) to (E) as shown in Table 3 were melted and kneaded with an extrusion machine to make pellets and the aforesaid evaluation (3) was carried out. Results of evaluation are shown in Table 3.

TABLE 1

| | Example | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Composition (weight %) | | | | | | | | | | | | | | | | | |
| A1) PBT CEG 15 | 56 | | | | | | | | | | | | | | | | |
| A2) PBT CEG 30 | | 56 | | | 61 | 61 | 56 | 61 | 56 | 61 | 56 | 54 | 56 | 54 | 55 | 56 | 55 |
| A3) PBT CEG 40 | | | 56 | | | | | | | | | | | | | | |
| A4) PBT CEG 60 | | | | 56 | | | | | | | | | | | | | |
| B1) EEA-g-BA/MMA | 10 | 10 | 10 | 10 | 5 | | | | | | | 10 | 10 | 10 | 10 | 10 | 10 |
| B2) Acrylic Core-shell | | | | | 5 | 10 | | | | | | | | | | | |
| B3) ESBS | | | | | | | 5 | 10 | | | | | | | | | |
| B4) EGMA-g-MMA | | | | | | | | | 5 | 10 | | | | | | | |
| C1) Silicone Powder | 3 | 3 | 3 | 3 | 3 | 3 | 3 | 3 | 3 | 3 | 3 | 5 | | | 3 | 3 | 3 |
| C2) Fluoro Group Containing Oligomer | | | | | | | | | | | | | 3 | 5 | | | |
| D1) Glass Fiber | 30 | 30 | 30 | 30 | 30 | 30 | 30 | 30 | 30 | 30 | 30 | 30 | 30 | 30 | 30 | 30 | 30 |
| E1) Epoxy Resin | 1 | 1 | 1 | 1 | 1 | 1 | 1 | 1 | 1 | 1 | 1 | 1 | 1 | 1 | 2 | | |
| E2) Isocyanate Compound | | | | | | | | | | | | | | | | 1 | 2 |
| Evaluation | | | | | | | | | | | | | | | | | |
| Evaluation (1) | 800 | 700 | 500 | 450 | 625 | 580 | 630 | 575 | 650 | 550 | 620 | 750 | 425 | 500 | 730 | 475 | 500 |
| Evaluation (2) | 350 | 315 | 225 | 200 | 280 | 270 | 280 | 270 | 300 | 280 | 310 | 340 | 190 | 225 | 330 | 220 | 225 |

TABLE 2

| | Comparative Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Composition (weight %) | | | | | | | | | | | | | | | |
| A1) PBT CEG 15 | | | | | | | | | | | | | 59 | | |
| A2) PBT CEG 30 | 100 | 70 | 60 | 60 | 60 | 60 | 67 | 67 | 69 | 69 | 57 | 59 | | | |
| A3) PBT CEG 40 | | | | | | | | | | | | | | 59 | |
| A4) PBT CEG 60 | | | | | | | | | | | | | | | 59 |
| B1) EEA-g-BA/MMA | | | 10 | | | | | | | | 10 | 10 | 10 | 10 | 10 |
| B2) Acrylic Core-shell | | | | 10 | | | | | | | | | | | |
| B3) ESBS | | | | | 10 | | | | | | | | | | |
| B4) EGMA-g-MMA | | | | | | 10 | | | | | | | | | |
| C1) Silicone Powder | | | | | | | 3 | | | | | 3 | | | |
| C2) Fluoro Group Containing Oligomer | | | | | | | | 3 | | | | | | | |
| D1) Glass Fiber | | 30 | 30 | 30 | 30 | 30 | 30 | 30 | 30 | 30 | 30 | 30 | 30 | 30 | 30 |
| E1) Epoxy Resin | | | | | | | | | 1 | | | 1 | 1 | 1 | 1 |
| E2) Isocyanate Compound | | | | | | | | | | 1 | | | | | |
| Evaluation | | | | | | | | | | | | | | | |
| Evaluation (1) | 0.5 | 1 | 20 | 15 | 15 | 22 | 8 | 7 | 5 | 5 | 24 | 24 | 20 | 24 | 20 |
| Evaluation (2) | 0.5 | 0.5 | 10 | 7 | 8 | 10 | 3 | 2 | 1 | 1.5 | 9 | 10 | 7 | 10 | 6 |

TABLE 3

| | | Example | Comparative Example | |
|---|---|---|---|---|
| | | 18 | 16 | 17 |
| Composition (wt. %) | A2) PBT CEG 30 | 56 | 54 | 59 |
| | B1) EEA-g-BA/MMA | 10 | 15 | 10 |
| | C1) Silicone Powder | 3 | — | — |
| | D1) Glass Fiber | 30 | 30 | 30 |
| | E1) Epoxy Resin | 1 | 1 | 1 |
| Evaluation 0.5% | Strain 1 Hr | ○ | ○ | ○ |
| | 4 Hr | ○ | Δ | Δ |
| | 8 Hr | ○ | Δ | x |
| | 24 Hr | ○ | Δ | — |
| | 2 days | Δ | x | — |
| | 3 days | Δ | — | — |
| | 4 days | x | — | — |
| Strain 1.0% | 1 Hr | ○ | ○ | ○ |
| | 4 Hr | ○ | Δ | x |
| | 8 Hr | ○ | x | — |
| | 24 Hr | Δ | — | — |
| | 2 days | x | — | — |

Result of Evaluation
Δ Don't come to Fracture
x Undergo Fracture

What is claimed is:

1. A thermoplastic polyester resin composition, comprising:
   (A) a thermoplastic polyester resin,
   (B) 2–20% by weight, based on total composition weight, of at least one impact resistance modifier selected from the group consisting of olefin-based thermoplastic elastomers, styrene-based thermoplastic elastomers, polyester-based thermoplastic elastomers, polyamide-based thermoplastic elastomers, urethane-based thermoplastic elastomers, and core-shell polymers having a rubber layer of diene-based elastomers, acrylic-based elastomers or combinations thereof,
   (C) 0.1–15% by weight, based on total composition weight, of at least one compound selected from the group consisting of silicone compounds and fluorine compounds,
   (D) 10–45% by weight, based on total composition weight, of an inorganic filler, and
   (E) 0.1–10% by weight, based on total composition weight, of at least one polyfunctional compound selected from the group consisting of bisphenol A epoxy resins, epoxy compounds, isocyanate compounds and carboxylic acid dianhydrides.

2. The composition according to claim 1, wherein the thermoplastic polyester resin (A) is a resin which is mainly composed of polybutylene terephthalate.

3. The composition according to claim 1, wherein the thermoplastic polyester resin (A) is a resin which is mainly composed of polybutylene terephthalate having a carboxyl end group concentration of 35 meq/kg or less.

4. The composition according to claim 1, wherein the impact resistance modifier (B) are graft copolymers in which a copolymer of ethylene with alkyl unsaturated carboxylate and at least one polymer or copolymer constituted from a repeating unit represented by the following formula (1) are chemically bonded in a branched or cross-linking structural manner:

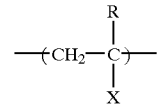

(I)

wherein R represents a hydrogen or a lower alkyl group; and X represents at least one group selected from —COOH, —COOCH$_3$, —COOC$_2$H$_5$, —COOC$_4$H$_9$, —COOCH$_2$CH(C$_2$H$_5$)C$_4$H$_9$,

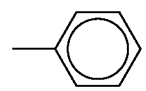

and —CN.

5. The thermoplastic polyester resin composition according to claim 1, wherein the silicone compound (C) is a hardened silicone powder where a silicone oil is absorbed therewith.

6. The composition according to claim 5, wherein the silicone oil is liquid at room temperature.

7. The composition according to claim 5, wherein the hardened silicone powder is made into a powder by absorption of 0.5–80% by weight of silicone oil having a viscosity of 100–200,000 cSt at 25° C.

8. The composition according to claim 5, wherein an average particle size of the hardened silicone powder is 0.1–20,000 μm.

9. The composition according to claim 1, wherein the inorganic filler (D) comprises a glass fiber.

10. The composition according to claim 1, wherein the polyfunctional compound (E) is a bisphenol A epoxy resin.

11. A molded article prepared by molding the composition mentioned in claim 1.

12. A molded article of polyester resins having a weld part in at least one portion, prepared by molding of the composition mentioned in claim 1.

13. A molded article of polyester resins having any one of a metal insert, a press-fitted member and a screwed part, prepared by molding of the composition mentioned in claim 1.

14. A press-fitted molded article of polyester resins, prepared by molding the composition mentioned in claim 1 and press-fitting a rigid member thereinto.

15. An insert-molded article prepared by insert-molding of the composition mentioned in claim 1 with an insert of a metal or an inorganic solid.

16. A thermoplastic polyester resin composition, comprising:

(A) a thermoplastic polyester resin, (B) 1–25% by weight, based on total composition weight, of at least one impact resistance modifier selected from the group consisting of olefin-based thermoplastic elastomers, styrene-based thermoplastic elastomers, polyester-based thermoplastic elastomers, polyamide-based thermoplastic elastomers, urethane-based thermoplastic elastomers, and core-shell polymers having a rubber layer of diene-based elastomers, acrylic-based elastomers or combinations thereof, (C) 0.1–15% by weight, based on total composition weight, of at least one compound selected from the group consisting of silicone compounds and fluorine compounds, (D) 1–50% by weight, based on total composition weight, of an inorganic filler, and (E) 0.1–10% by weight, based on total composition weight, of at least one polyfunctional compound selected from the group consisting of bisphenol A epoxy resins, epoxy compounds, isocyanate compounds and carboxylic acid dianhydrides.

17. A thermoplastic polyester resin composition as in claim 16, wherein component (D) is present in an amount of 1–45% by weight.

* * * * *